US012281492B2

(12) United States Patent
Lunday et al.

(10) Patent No.: US 12,281,492 B2
(45) **Date of Patent: *Apr. 22, 2025**

(54) HANDLE RETENTION

(71) Applicant: Schlage Lock Company LLC, Carmel, IN (US)

(72) Inventors: Drake Lunday, Colorado Springs, CO (US); Adam M. Litwinski, Centennial, CO (US); David J. Hurlbert, Manitou Springs, CO (US); Zachary Wiggins, Colorado Springs, CO (US); Marshall Owens, Colorado Springs, CO (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,299

(22) Filed: Dec. 5, 2023

(65) Prior Publication Data

US 2024/0102311 A1 Mar. 28, 2024

Related U.S. Application Data

(63) Continuation of application No. 17/172,340, filed on Feb. 10, 2021, now Pat. No. 11,834,864.

(51) Int. Cl.
*E05B 3/00* (2006.01)
*E05B 15/00* (2006.01)

(52) U.S. Cl.
CPC ............ *E05B 3/00* (2013.01); *E05B 15/0053* (2013.01); *E05B 15/006* (2013.01)

(58) Field of Classification Search
CPC ... E05B 3/00; E05B 3/003; E05B 3/04; E05B 3/10; E05B 15/0053; E05B 15/006; E05B 15/0033
See application file for complete search history.

(56) References Cited

U.S. PATENT DOCUMENTS

| | | | |
|---|---|---|---|
| 768,952 | A | 8/1904 | Roberts |
| 1,487,496 | A | 3/1924 | Wentworth |

(Continued)

FOREIGN PATENT DOCUMENTS

| | | | |
|---|---|---|---|
| DE | 202005017497 | U1 | 3/2007 |
| EP | 1152106 | B1 | 6/2003 |

(Continued)

OTHER PUBLICATIONS

Australian Examination Report; Australian Intellectual Property Office; Australian Application No. 2022219947; Aug. 12, 2024; 4 pages.

(Continued)

*Primary Examiner* — Christopher J Boswell
(74) *Attorney, Agent, or Firm* — Taft Stettinius & Hollister LLP

(57) ABSTRACT

A handleset includes a housing, a spindle sleeve, a handle, a coupler, and a spindle. The spindle sleeve includes an aperture, and is rotatably mounted to the housing. The handle is mounted to the spindle sleeve and includes a recess aligned with the aperture. The coupler is movably mounted in the aperture for movement between a decoupling position and a coupling position. The coupler in the coupling position is disengaged from the recess and does not prevent removal of the handle from the spindle sleeve. The coupler in the coupling position extends into the recess and prevents removal of the handle from the spindle sleeve. The spindle is movably received in the spindle sleeve and selectively retains the coupler in the coupling position.

23 Claims, 7 Drawing Sheets

(56) References Cited

U.S. PATENT DOCUMENTS

| | | | | |
|---|---|---|---|---|
| 2,656,210 | A * | 10/1953 | Kump | B25G 1/00 403/329 |
| 4,884,834 | A | 12/1989 | Ozagir et al. | |
| 5,782,119 | A | 7/1998 | Ellis | |
| 6,297,725 | B1 | 10/2001 | Tischendorf et al. | |
| 6,981,726 | B2 | 1/2006 | Huang | |
| 7,275,402 | B2 | 10/2007 | Luling et al. | |
| 7,281,738 | B2 | 10/2007 | Shen et al. | |
| 7,686,357 | B2 | 3/2010 | Engel et al. | |
| 8,539,801 | B2 | 9/2013 | Calleberg | |
| 8,544,903 | B1 | 10/2013 | Shamp et al. | |
| 8,904,836 | B2 | 12/2014 | Guo | |
| 8,967,686 | B2 * | 3/2015 | Rudhager | E05B 15/02 292/357 |
| 9,022,437 | B2 | 5/2015 | Ludwig et al. | |
| 9,062,475 | B1 | 6/2015 | Shamp et al. | |
| 9,175,499 | B2 | 11/2015 | Huang et al. | |
| 9,834,955 | B2 | 12/2017 | Ludwig et al. | |
| 10,422,162 | B2 | 9/2019 | Uhlmann | |
| 10,724,274 | B2 | 7/2020 | Murphy et al. | |
| 11,193,303 | B2 | 12/2021 | Morstatt | |
| 11,391,059 | B2 | 7/2022 | Alber et al. | |
| 11,834,864 | B2 * | 12/2023 | Lunday | E05B 15/0053 |
| 11,976,494 | B2 * | 5/2024 | Luebeck | E05B 15/0033 |
| 2007/0170731 | A1 * | 7/2007 | Shen | E05B 3/00 292/348 |
| 2010/0187839 | A1 | 7/2010 | Barlett | |
| 2013/0276491 | A1 | 10/2013 | Huang et al. | |
| 2017/0037661 | A1 * | 2/2017 | Tessier | E05B 17/08 |
| 2018/0291646 | A1 * | 10/2018 | Brun | E05B 3/04 |
| 2019/0316715 | A1 | 10/2019 | Remenik | |
| 2020/0115921 | A1 | 4/2020 | Alber et al. | |
| 2023/0272642 | A1 * | 8/2023 | Hu | E05B 15/0053 292/336.3 |
| 2024/0247517 | A1 * | 7/2024 | Luebeck | E05B 1/003 |

FOREIGN PATENT DOCUMENTS

| | | | |
|---|---|---|---|
| EP | 1713991 | B1 | 10/2012 |
| EP | 2961899 | B1 | 11/2016 |
| GB | 726195 | A | 3/1955 |
| GB | 2273143 | B | 1/1996 |
| WO | 2011119097 | A1 | 9/2011 |

OTHER PUBLICATIONS

International Search Report; ISA/US; International Application No. PCT/US2022/015900; Jul. 14, 2022; 4 pages.
Written Opinion of the International Searching Authority; ISA/US; International Application No. PCT/US2022/015900; Jul. 14, 2022; 8 pages.
Canadian Examination Report; Canadian Intellectual Property Office; Canadian Application No. 3,208,079; Dec. 3, 2024; 7 pages.
Extended European Search Report; European Patent Office; European Patent Application No. 22753309.8; Dec. 12, 2024; 7 pages.
New Zealand Examination Report; New Zealand Intellectual Property Office; new Zealand Patent Application No. 803445; Mar. 12, 2025; 4 pages.

* cited by examiner

HANDLE RETENTION

CROSS-REFERENCE TO RELATED APPLICATIONS

The present application is a continuation of U.S. patent application Ser. No. 17/172,340 filed Feb. 10, 2021 and issued as U.S. Pat. No. 11,834,864, the contents of which are hereby incorporated by reference in their entirety.

TECHNICAL FIELD

The present disclosure generally relates to handle devices, and more particularly but not exclusively relates to handle devices for locksets.

BACKGROUND

Handles for locksets are commonly secured by a variety of mechanisms, such as set screws, spring-biased catches, and/or threaded bushings. In certain circumstances, it may be desirable to have the handle on the outer (non-egress) side to be not easily removable, for example to discourage vandalism. Certain existing solutions involve catches that interact with the tailpiece of a lock cylinder to prevent depression of the catch when the lock cylinder is in the locked position. Other existing approaches utilize a fixed trim in which the handle is not removable from the lock trim, and is designated as the outside trim from the factory. Further existing approaches involve handle catches that can only be manipulated to remove the handle when the trim is off the door. However, each of these approaches has its own drawbacks and limitations. For these reasons among others, there remains a need for further improvements in this technological field.

SUMMARY

An example handleset includes a housing, a spindle sleeve, a handle, a coupler, and a spindle. The spindle sleeve includes an aperture, and is rotatably mounted to the housing. The handle is mounted to the spindle sleeve and includes a recess aligned with the aperture. The coupler is movably mounted in the aperture for movement between a decoupling position and a coupling position. The coupler in the coupling position is disengaged from the recess and does not prevent removal of the handle from the spindle sleeve. The coupler in the coupling position extends into the recess and prevents removal of the handle from the spindle sleeve. The spindle is movably received in the spindle sleeve and selectively retains the coupler in the coupling position. Further embodiments, forms, features, and aspects of the present application shall become apparent from the description and figures provided herewith.

DETAILED DESCRIPTION OF ILLUSTRATIVE EMBODIMENTS

Figure 1:
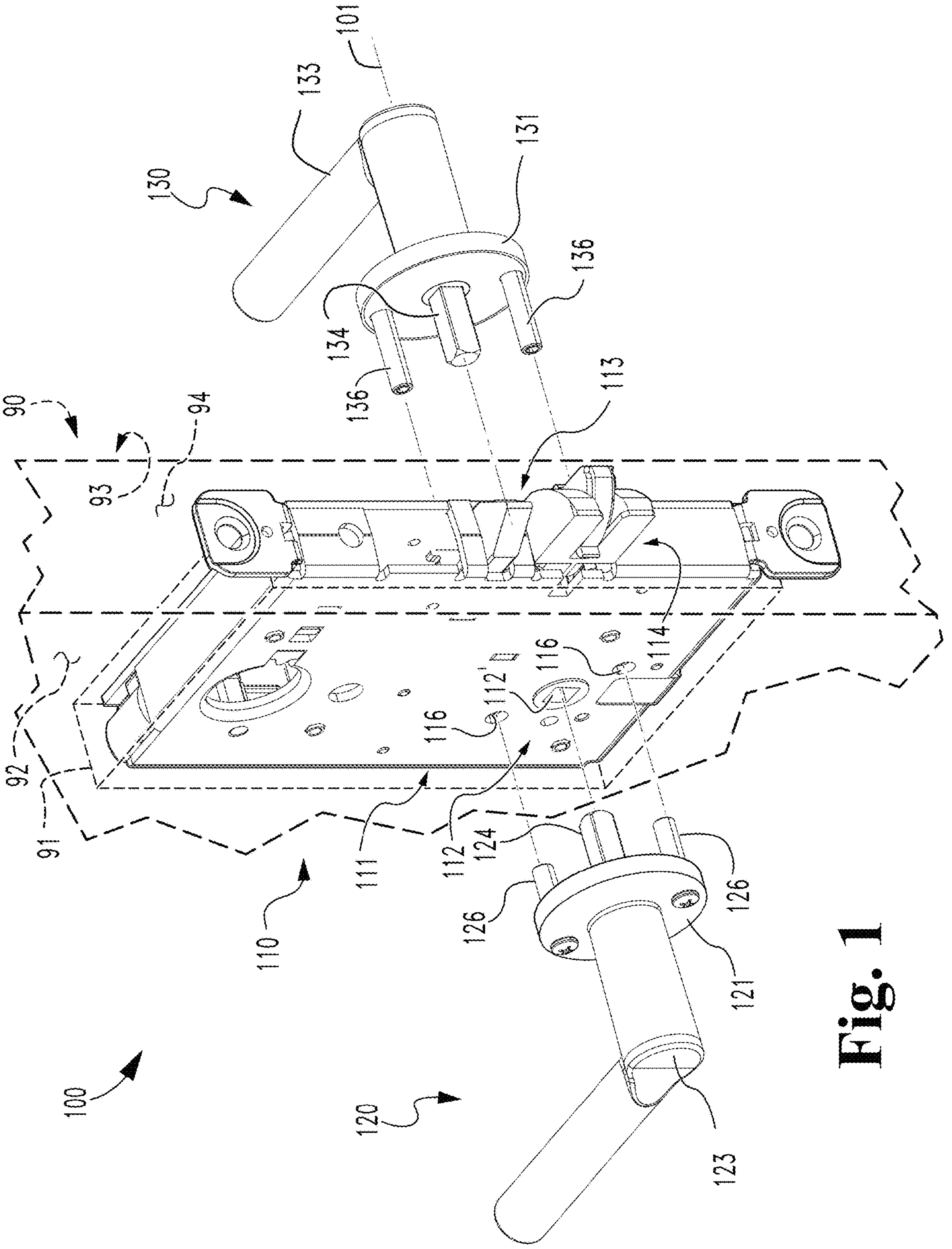
FIG. 1 is an exploded assembly view of a lockset according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a lockset 100 according to certain embodiments installed to a door 90. The door 90 has a door preparation in the form of a mortise cutout 91 formed therein, and includes an outer or non-egress side 92, an inner or egress side 93, and a latch edge 94. The lockset 100 generally includes a chassis 110 mounted in the cutout 91, an outside handleset 120 mounted to the outer or non-egress side 92, and an inside handleset 130 mounted to the inner or egress side 93.

The chassis 110 generally includes a housing 111, a first or outside hub 112 rotatably mounted to the housing 111 on a first side of the chassis 110, a second or inside hub 113 rotatably mounted to the housing 111 on an opposite second side of the chassis 110, and a latchbolt 114 mounted for movement relative to the housing 111 between an extended position and a retracted position. Each hub 112, 113 is mounted for rotation about a longitudinal rotational axis 101 that extends into each of the handlesets 120, 130. Each hub 112, 113 is independently rotatable, and is operably connected with the latchbolt 114 such that rotation of either hub 112, 113 from a home position to a rotated position causes a corresponding retraction of the latchbolt 114. In the illustrated form, the chassis 110 is provided as a mortise-format chassis that mounts in the mortise cutout 91 of the door 90. As described herein, it is also contemplated that the chassis 110 may take another format, such as the cylindrical format, the tubular format, a hybrid format, or another format. Those skilled in the art will be familiar with these formats and readily recognize the manner in which each format translates rotation of a rotatable member to retraction of a latchbolt. As such, the details regarding retraction of a latchbolt in response to rotation of a rotatable member need not be provided herein.

The outside handleset 120 is configured for mounting to the outer or non-egress side 92 of the door 90, and generally includes an outside housing 121, an outside handle 123 rotatably mounted to the outside housing 121, and an outside spindle 124 rotationally coupled with the outside handle 123. As described herein, the handleset 120 includes features that prevent removal of the handle 123 when the handleset 120 is installed to the chassis 110. When the outside handleset 120 is mounted to the chassis 110, the spindle 124 is engaged with the outside hub 112 such that the outside hub 112 is rotationally coupled with the outside handle 123. More particularly, the distal end portion of the spindle 124 is received in and engaged with an opening 112' formed in the hub 112 such that the spindle 124 is rotationally coupled with the hub 112. Thus, when the lockset 100 is unlocked, the outside hub 112 causes retraction of the latchbolt 114 in response to rotation of the outside handle 123.

The inside handleset 130 is configured for mounting to the inner or egress side of the door 90, and is in many ways similar to the outside handleset 120. The inside handleset 130 generally includes an inside housing 131, an inside handle 133 rotatably mounted to the inside housing 131, and an inside spindle 134 rotationally coupled with the inside handle 133. When the inside handleset 130 is mounted to the chassis 110, the spindle 134 is engaged with the inside hub 113 such that the inside hub 113 is rotationally coupled with the inside handle 133. Thus, the inside hub 113 causes retraction of the latchbolt 114 in response to rotation of the inside handle 133.

The handlesets 120, 130 may include features that facilitate the removable mounting of the handlesets 120, 130 to the chassis 110. In the illustrated form, the outside handleset 120 includes a pair of lugs 126 configured to extend into a pair of openings 116 formed in the chassis 110, and the inside handleset 130 includes a pair of bolts 136 that extend into the chassis 130 and engage the lugs 126 such that the chassis 110 is securely captured between the handlesets 120, 130. It should be appreciated that other configurations are contemplated. For example, the inside handleset 130 may include one or more lugs and the outside handleset 120 may include one or more bolts that extend into the chassis 110 and engage the lugs of the inside handleset 130.

Figure 2:
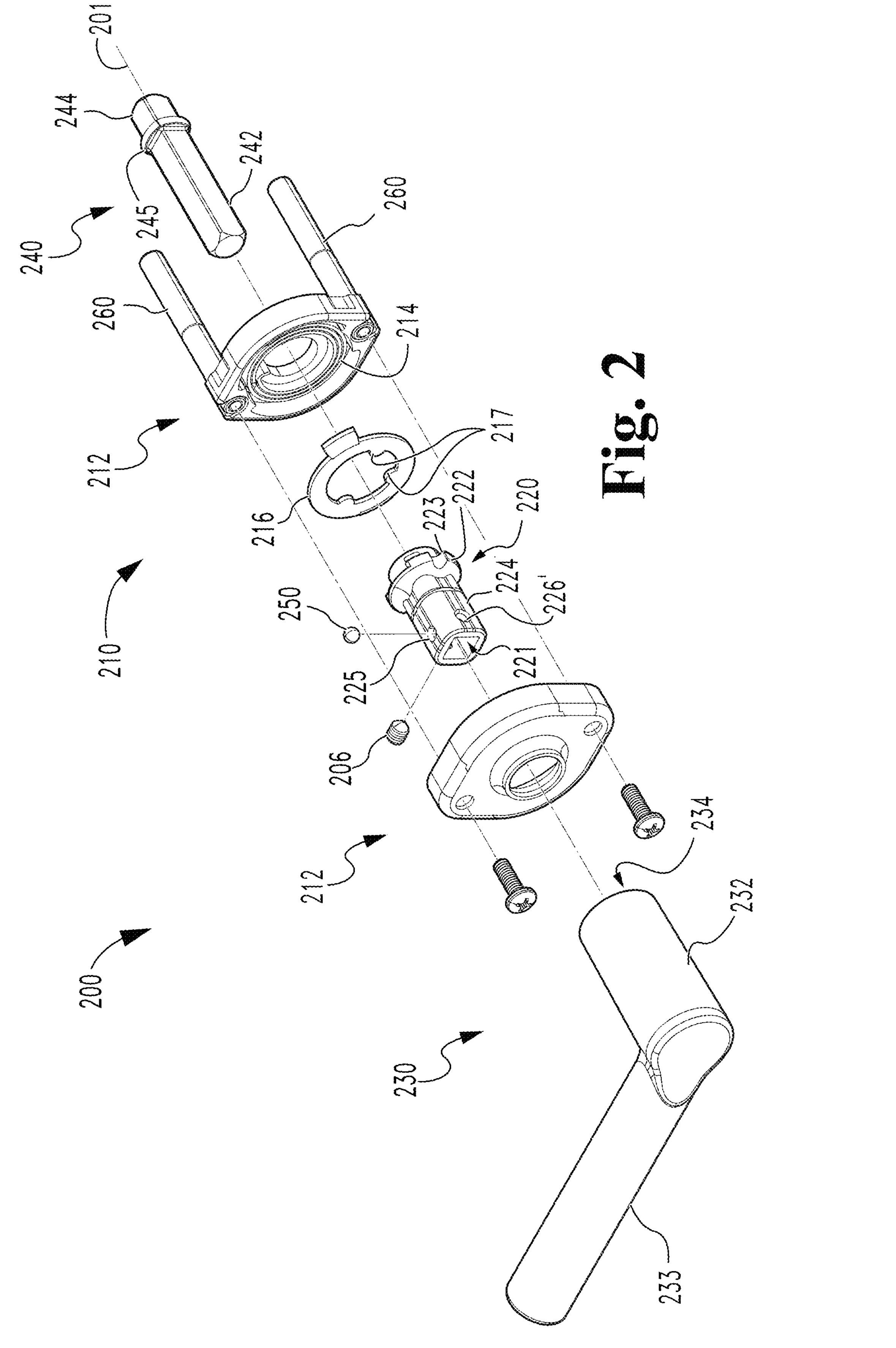
FIG. 2 is an exploded assembly view of a handleset according to certain embodiments.

With additional reference to FIG. 2, illustrated therein is a handleset 200 according to certain embodiments. The handleset 200 may, for example, be utilized as the outside handleset 120 in the lockset 100 illustrated in FIG. 1. The handleset 200 generally includes a housing in the form of a spring cage 210, a spindle sleeve 220 rotatably supported by the spring cage 210 for rotation about a longitudinal axis 201, a handle 230 removably mounted to the spindle sleeve 220, a spindle 240 slidably received in the spindle sleeve 220, and a coupler 250 operable to selectively prevent removal of the handle 230 from the spindle sleeve 220, and may further include one or more lugs 260 along the lines of the above-described lugs 126. In certain embodiments, the handleset 200 may include a rose 204 that covers the spring cage 210. In certain embodiments, the handleset 200 may include a fastener 206, such as a set screw, which may be utilized to removably secure the handle 230 to the spindle sleeve 220.

The spring cage 210 generally includes a housing 212 and a biasing member 214 engaged between the housing 212 and the spindle sleeve 220 such that the biasing member 214 biases the spindle sleeve 220 toward a home position relative to the housing 212. In the illustrated form, the spring cage 210 further includes a collar 216 that receives the spindle 240, and the biasing member 214 is engaged between the housing 212 and the collar 216. The inner perimeter of the collar 216 is sized and shaped for rotational coupling with the spindle sleeve 220, and in the illustrated form includes one or more first engagement features 217 sized and shaped to engage corresponding second engagement features 223 of the spindle sleeve 220 to thereby rotationally couple the spindle sleeve 220 with the collar 216. As a result, the spindle sleeve 220 is rotationally biased toward a home position, thereby biasing the handle 230 and the spindle 210 toward home positions. It is also contemplated that the spring cage 210 may take another form, such as one in which the biasing member 214 directly engages the spindle 240, or one in which the collar 216 engages the spindle 240. Moreover, while the illustrated biasing member 214 is provided in the form of a clock spring or spiral leaf spring, it is also contemplated that the biasing member 214 may take another form, such as one that of a torsion spring, a compression spring, an elastic element, and/or magnets.

Figure 4:
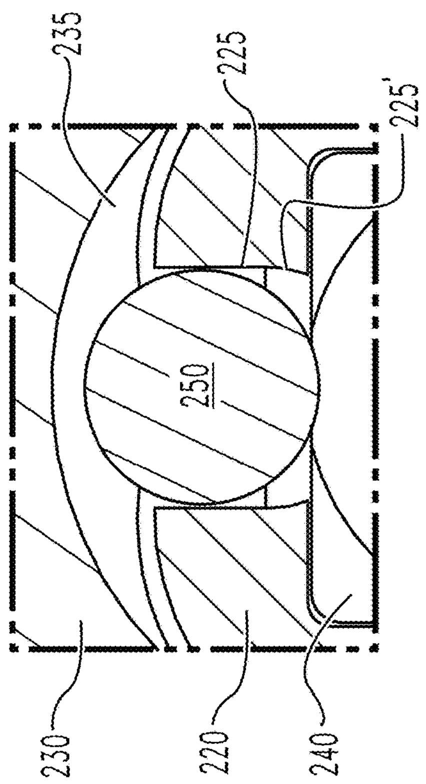
FIG. 4 is an enlarged view of the inset IV in FIG. 3.
Figure 3:
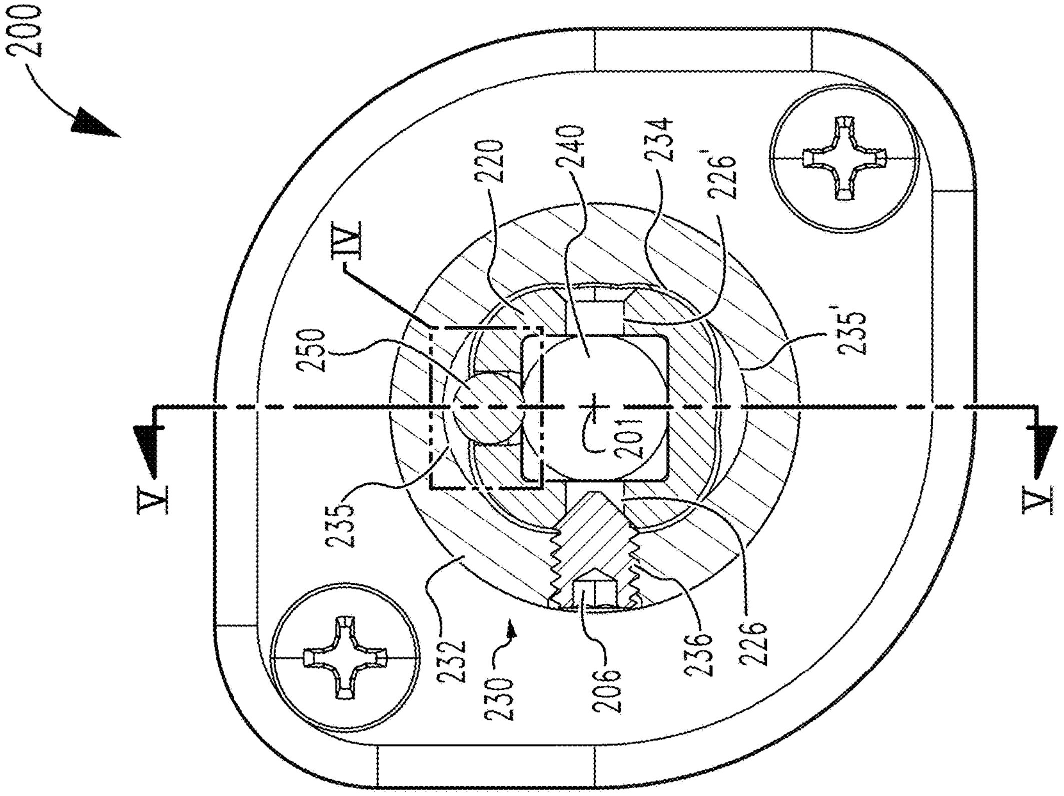
FIG. 3 is a lateral cross-sectional view of the handleset illustrated in FIG. 2.

With additional reference to FIGS. 3 and 4, the spindle sleeve 220 defines an internal chamber 221, and generally includes a base portion 222 and a longitudinally-extending body 224 extending proximally from the base portion 222. The chamber 221 is sized and shaped to slidably receive a portion of the spindle 240 for rotational coupling with the spindle 240. While other geometries are contemplated, the illustrated chamber 221 has a generally square-shaped cross-section that mates with a corresponding generally square-shaped cross-section of the spindle 240. The base portion 222 is positioned at a distal end of the spindle sleeve 220, and includes one or more second engagement features 223 that mate with the one or more collar engagement features 217 to rotationally couple the spindle sleeve 220 with the collar 216. As a result, the spindle sleeve 220 is biased to a home position by the biasing member 214.

In the illustrated form, the body 224 is sized and shaped for rotational coupling with the handle 230. More particularly, the body 224 has a generally square-shaped cross-section that mates with a corresponding generally square-shaped cross-section of the interior of the handle 230 such that the spindle sleeve 220 is rotationally coupled with the handle 230. It is also contemplated that the body 224 may not necessarily be configured for rotational coupling with the handle 230, and may instead be rotationally coupled with the handle 230 only via the fastener 206. The body 224 includes a first or coupler-receiving aperture 225 for receiving the coupler 250, and may further include a second or fastener-receiving aperture 226 for receiving a portion of the fastener 206. In certain embodiments, the coupler-receiving aperture 225 may include one or more retention features for maintaining the coupler 250 movably seated in the aperture 225. In the illustrated form, for example, the aperture 225 includes a chamfer 225' on its radially inner side to aid in preventing the coupler 250 from entering the central chamber 221 of the spindle sleeve 220. Additionally or alternatively, the aperture 225 may include a chamfer on its radially outer side to aid in preventing the coupler 250 from exiting the aperture 225 in the radially-outward direction.

The spindle sleeve 220 may further include a second fastener-receiving aperture 226' diametrically opposite the first fastener-receiving aperture 226 in order to facilitate a handing change for the handle 230 as described herein. In the illustrated form, the coupler-receiving aperture 225 is offset from the fastener-receiving apertures 226, 226' by about 90° about the longitudinal or rotational axis 201. It is also contemplated that the coupler-receiving aperture 225 may be diametrically opposite the fastener-receiving aperture 226, for example in embodiments in which the handleset 200 does not accommodate handing changes for the handle 230. Furthermore, while each of the illustrated fastener-receiving apertures 226, 226' extends radially through the wall of the body 224, it is also contemplated that the aperture 226 and/or the aperture 226' may not necessarily extend through the entire thickness of the wall that defines the body 224.

The handle 230 is removably mounted to the spindle sleeve 220, and generally includes a shank 232 extending along the longitudinal axis 201 and a grip portion 233 extending from the shank 232 in at least one direction transverse to the longitudinal axis 201. In the illustrated form, the handle 230 is provided as a lever handle in which the grip portion 233 extends from the shank 232 primarily in one direction transverse to the longitudinal axis 201. It is also contemplated that the handle 230 may take another form in which the grip portion 233 extends from the shank 232 in multiple directions transverse to the longitudinal axis 201. For example, the handle 230 may be provided in the form of a knob-type handle in which the grip portion 233 is provided as a knob.

With additional reference to FIG. 3, the handle 230 further includes a chamber 234 extending from a distal end of the shank 232. In the illustrated form, the chamber 234 has a generally square-shaped cross-section to mate with the generally square-shaped cross-section of the spindle sleeve body 224. It is also contemplated that the chamber 234 may have different cross-sectional geometries. A recess 235 is formed in the chamber 234, and an aperture 236 extends through the thickness of the wall defining the shank 232. The chamber 234 receives the body 224 of the spindle sleeve 220 such that the recess 235 is aligned with the coupler-receiving aperture 225 and the handle aperture 236 is aligned with the coupler-receiving aperture 226. The fastener 206 extends between the shank aperture 236 and the fastener-receiving aperture 226, thereby rotationally coupling the handle 230 with the spindle sleeve 220. As a result, the handle 230 is biased toward a handle home position by the spring cage 210.

Figure 7:
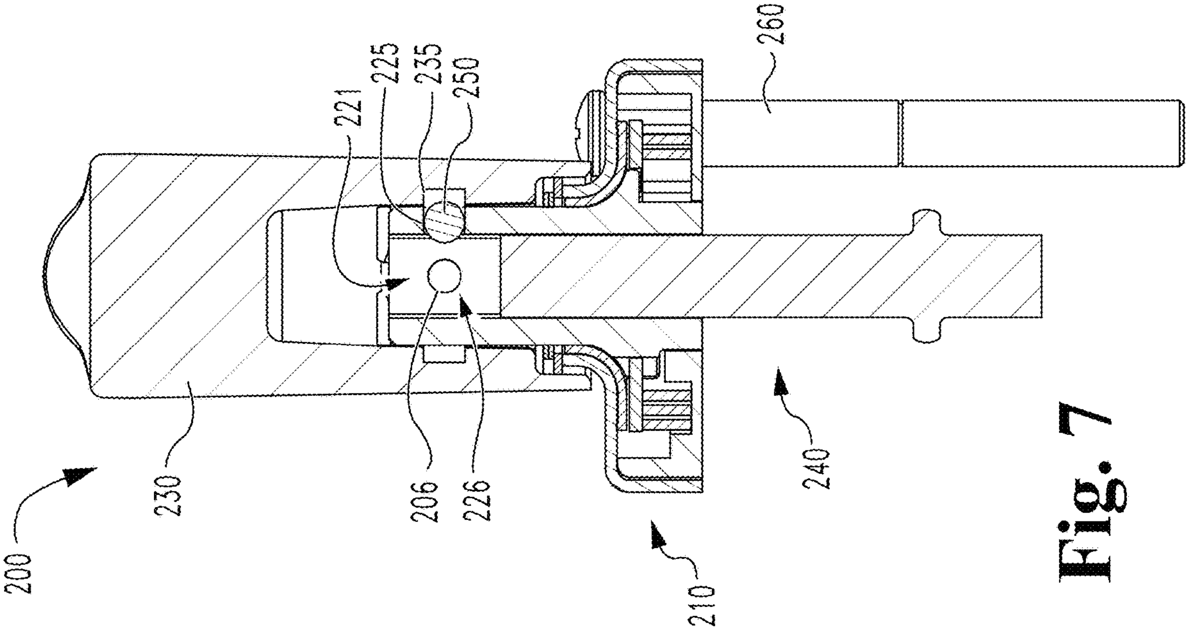
FIG. 7 is a cross-sectional view of the handleset illustrated in FIG. 2 with the spindle in a releasing position.
Figure 6:
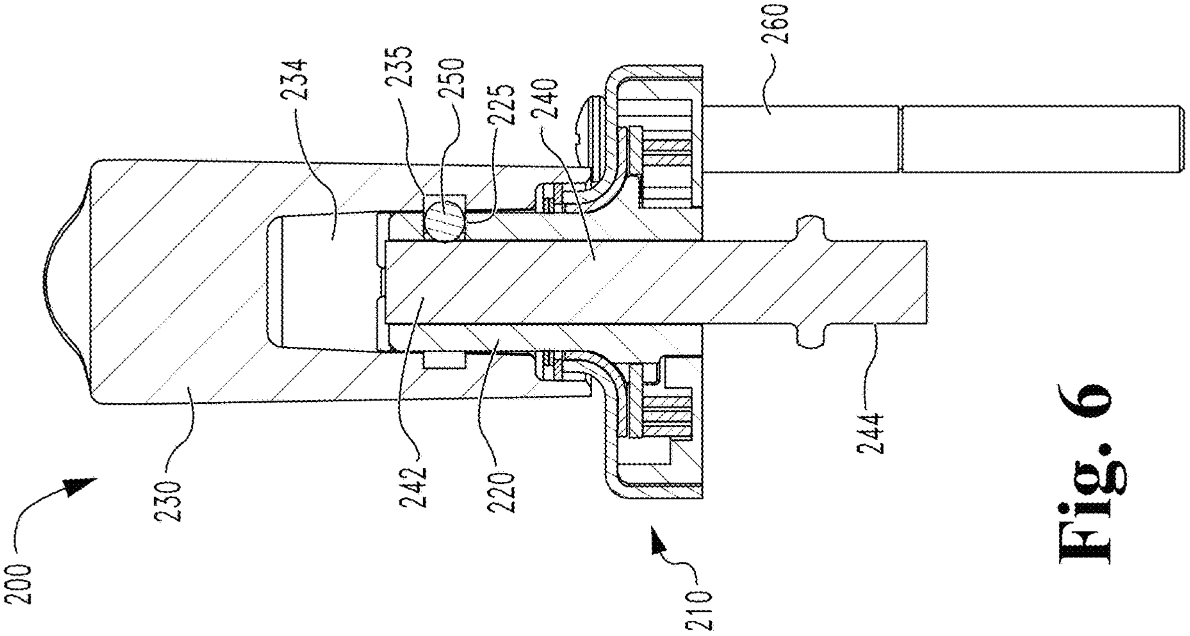
FIG. 6 is a cross-sectional view of the handleset illustrated in FIG. 2 with a spindle in a retaining position.

With additional reference to FIGS. 6 and 7, the spindle 240 is slidably received in the spindle sleeve 220 for movement between a distal release position (FIG. 6) and a proximal retaining position (FIG. 7). The spindle 240 generally includes a proximal end portion 242 and an opposite distal end portion 244, and a flange 245 is formed in or adjacent to the distal end portion 244. The proximal end portion 242 extends into the chamber 221 of the spindle sleeve 220. The proximal end portion 242 is rotationally coupled with the spindle sleeve 220, and the spindle sleeve 220 is engaged rotationally coupled with the collar 216 such that the spindle 240 is biased toward a spindle home position by the spring cage 210.

The proximal end portion 242 is sized and shaped for rotational coupling with the spindle sleeve 220. For example, the illustrated proximal end portion 242 has a generally square-shaped cross-section corresponding to the generally square-shaped cross-section of the chamber 221. It is also contemplated that one or both of the chamber 221 and/or the proximal end portion 242 may have a different geometry. The distal end portion 244 is sized and shaped to engage the hub 112 for rotational coupling with the hub 112. In the illustrated form, the opening 112' in the outside hub 112 has a generally square-shaped cross-section, and the distal end portion 244 has a corresponding generally square-shaped cross-section. It is also contemplated that one or both of the chamber opening 112' and/or the distal end portion 244 may have a different geometry. When the distal end portion 244 is seated in the opening 112, the flange 245 may abut the face of the hub 112.

The coupler 250 is movably mounted in the aperture 225 of the spindle sleeve 220 for movement between a radially outer coupling position (FIG. 6) and a radially inner decoupling position (FIG. 7). In the illustrated form, the coupler 250 is provided in the form of a spherical ball bearing. It is also contemplated that the coupler 250 may take another form. For example, in certain embodiments, the coupler 250 may take the form of a cylindrical roller bearing. In further embodiments, the coupler 250 may take the form of a peg. When in its decoupling position, the coupler 250 is disengaged from the recess 235 and does not prevent removal of the handle 230 from the spindle sleeve 220. When the coupler 250 is held in its coupling position (e.g., by the spindle 240 as described herein), the coupler 250 is engaged with the recess 236 and provides interference between the spindle sleeve 220 and the handle 230, thereby preventing removal of the handle 230 from the spindle sleeve 220. The radially-outer side and/or the radially-inner side of the aperture 225 may include one or more projections that restrict the coupler 250 to movement between its coupling and decoupling positions, thereby discouraging loss of the coupler 250 during assembly and installation of the handleset 200. For example, in the illustrated form, the coupler-receiving aperture 225 includes the above-described chamfer 225', which discourages the coupler 250 from falling into the chamber 221 when the spindle 240 is in the release position.

In embodiments that include the lugs 260, the lugs 260 extend generally parallel to the longitudinal axis 201, and are configured to extend into the openings 116 of the chassis 110. Each lug 260 is configured to receive a corresponding and respective bolt of an inside handle assembly, such as the bolts 136 of the inside handle assembly 130. The lugs 260 may be mounted to the housing 212 of the spring cage 210 at locations selected such that the lugs 260 do not interfere with the rotation of the plate 216 through its normal rotational range.

With the handleset 200 in an uninstalled state (i.e., when the handleset 200 is not installed to a lockset such as the lockset 100), the spindle 240 is slidable relative to the remainder of the handleset 200 between a proximal retaining position (FIG. 6) and a distal release position (FIG. 7). From the release position, the spindle 240 may be moved distally out of engagement with the spindle sleeve 220 for removal from the handleset 200. With the spindle 240 in the release position, the proximal end portion 242 is disengaged from the coupler 250 such that the coupler 250 is free to move between its radially-inward decoupling position and its radially-outward coupling position. As a result, the handle 230 can be removed from the spindle sleeve 220 upon disengagement of the fastener 206 from the spindle sleeve 220.

When the spindle 240 is in the retaining position, the proximal end portion 242 is positioned proximally of the spring cage 210 and is engaged with the coupler 250, and the distal end portion 244 is positioned distally of the spring cage 210 and is operable to engage the hub 112 of the lockset 100. When the handleset 200 is installed to the lockset 100, the chassis 110 retains the spindle 240 in its retaining position, thereby retaining the coupler 250 in its coupling position. As a result, when the handleset 200 is installed to the lockset 100, removal of the fastener 206 does not enable removal of the handle 230, as removal of the handle 230 is prevented by the coupler 250 as described above. By preventing removal of the handle 230 from the more-exposed exterior side of the door 90 while the handleset 200 is installed, the threat of a vandal removing the handle 230 may be mitigated.

Figure 5:
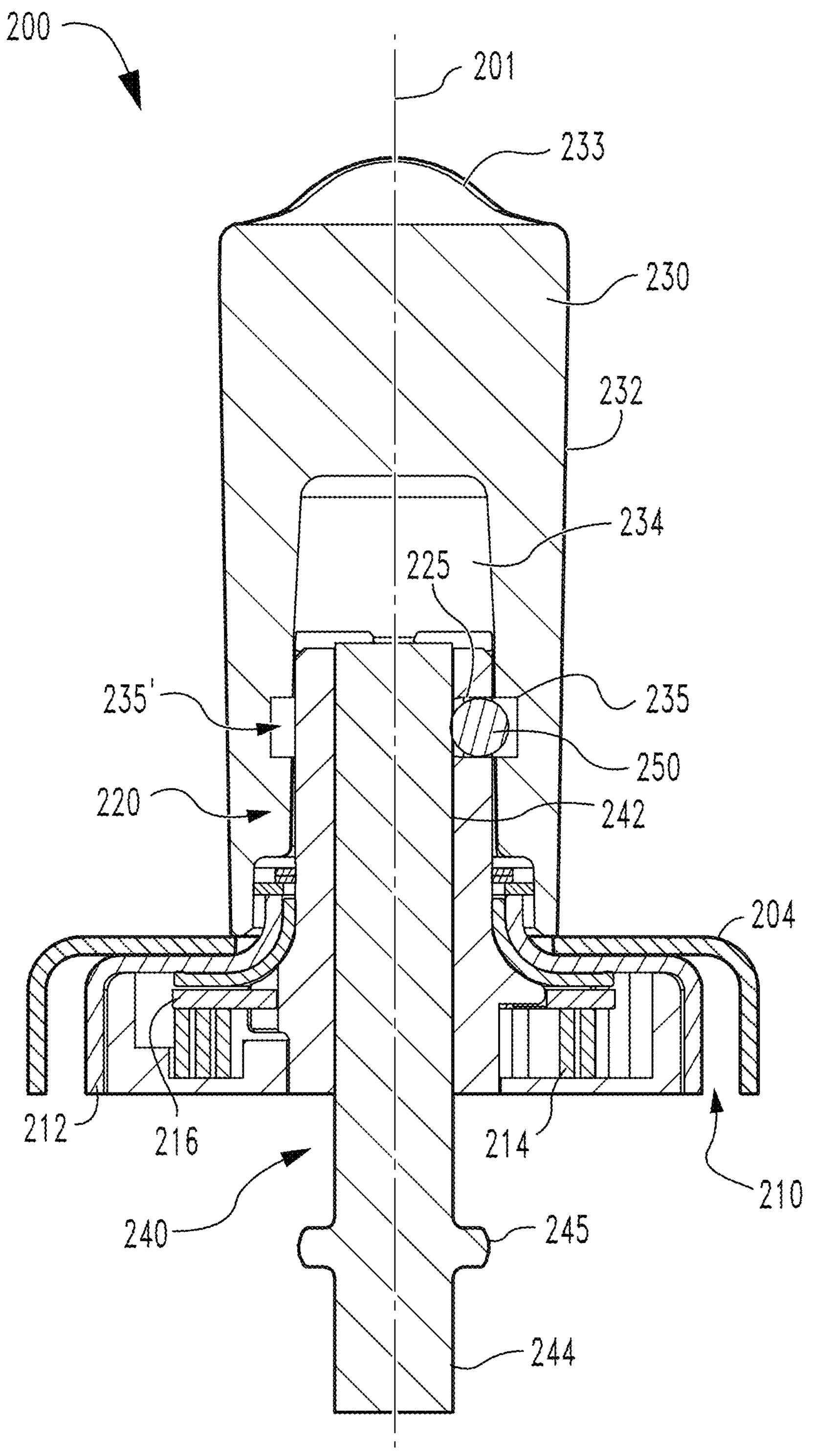
FIG. 5 is a longitudinal cross-sectional view of the handleset illustrated in FIG. 2, taken along the line V-V illustrated in FIG. 3.

In the illustrated form, each recess 235 in the handle 230 has a generally rectangular longitudinal cross-section, as illustrated in FIGS. 5-7. It is also contemplated that the recess 235 may have another cross-sectional geometry. For example, the recess 235 may have a triangular or V-shaped radial cross-section, or may be curvilinear with a U-shaped radial cross-section. Additionally, while removal of the handle 230 in the illustrated handleset 200 is selectively prevented by each of the coupler 250 and the fastener 206, it is also contemplated that removal of the handle 230 may be prevented entirely by the coupler 250 and optionally at least one additional coupler 250. One examples of a handleset 300 in which removal of a handle is prevented entirely by couplers along the lines of the coupler 250 is described herein with reference to FIGS. 8 and 9, and another such handleset 400 is described herein with reference to FIGS. 10 and 11.

Figure 9:
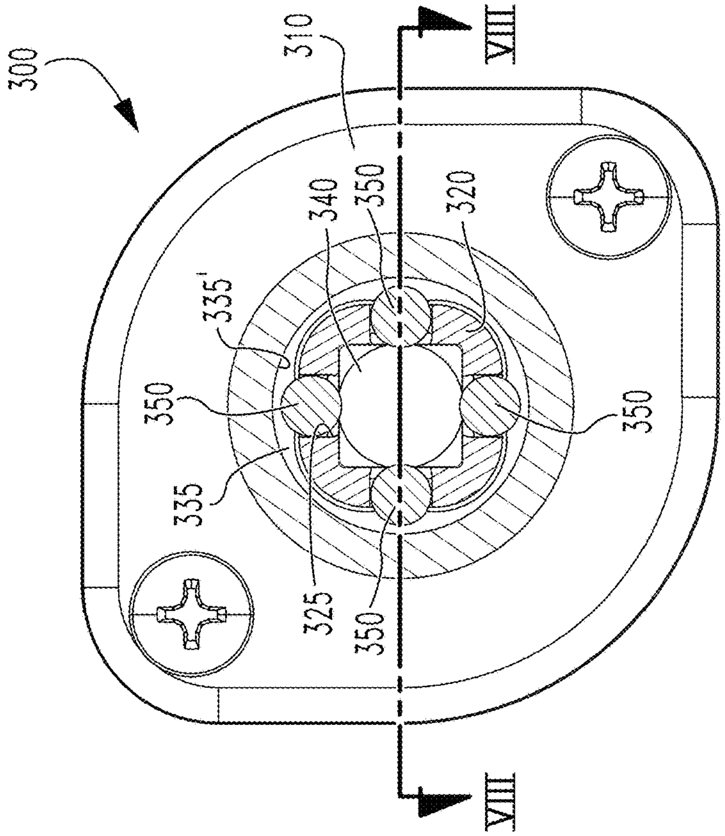
FIG. 9 is a lateral cross-sectional view of the handleset illustrated in FIG. 8, taken along the line IX-IX illustrated in FIG. 8.
Figure 8:
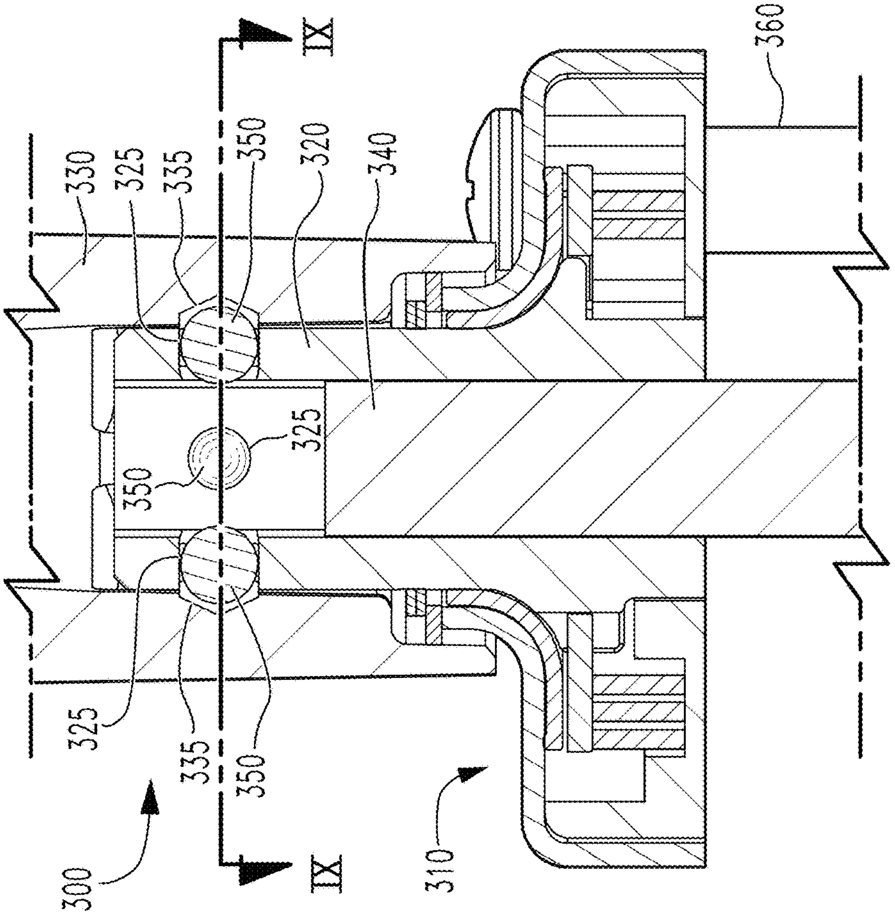
FIG. 8 is a longitudinal cross-sectional view of a handleset according to certain embodiments, taken along the line VIII-VIII illustrated in FIG. 9.

With additional reference to FIGS. 8 and 9, illustrated therein is a handleset 300 according to certain embodiments. The handleset 300 may, for example, be utilized as the outside handleset 120 in the lockset 100 illustrated in FIG. 1. The handleset 300 is substantially similar to the above-described handleset 200, and similar reference characters are used to indicate similar elements and features. For example, the handleset 300 includes a spring cage 310, a spindle sleeve 320, a handle 330, a spindle 340, a coupler 350, and a pair of lugs 360, which respectively correspond to the spring cage 210, the spindle sleeve 220, the handle 230, the spindle 240, the coupler 250, and the lugs 260. In the interest of conciseness, the following descriptions of the handleset 300 focus primarily on features that are different than those described above with regard to the handleset 200.

The illustrated handleset 300 includes a plurality of couplers 350, each of which corresponds to the above-described coupler 250. Accordingly, the handleset 300 also includes additional features that accommodate the plural couplers 350 and ensure that each of the couplers 350 is operable to aid in the retention of the handle 330 to the spindle sleeve 320. For example, the spindle sleeve 320 includes plural coupler-receiving apertures 325, each of which movably receives a corresponding and respective one of the couplers 350. Additionally, the handle 330 includes a plurality of recesses 335, each of which is operable to engage a corresponding and respective one of the couplers 350. In the illustrated form, the handle 330 includes an annular groove 335' that defines each of the recesses 335. It is also contemplated that the recesses 335 may be provided as distinct and disconnected recesses 335. In the illustrated form, the groove 335' is substantially triangular with a V-shaped cross-section. It is also contemplated that the groove 335' may have a rectangular cross-section or a U-shaped cross-section.

Figure 11:
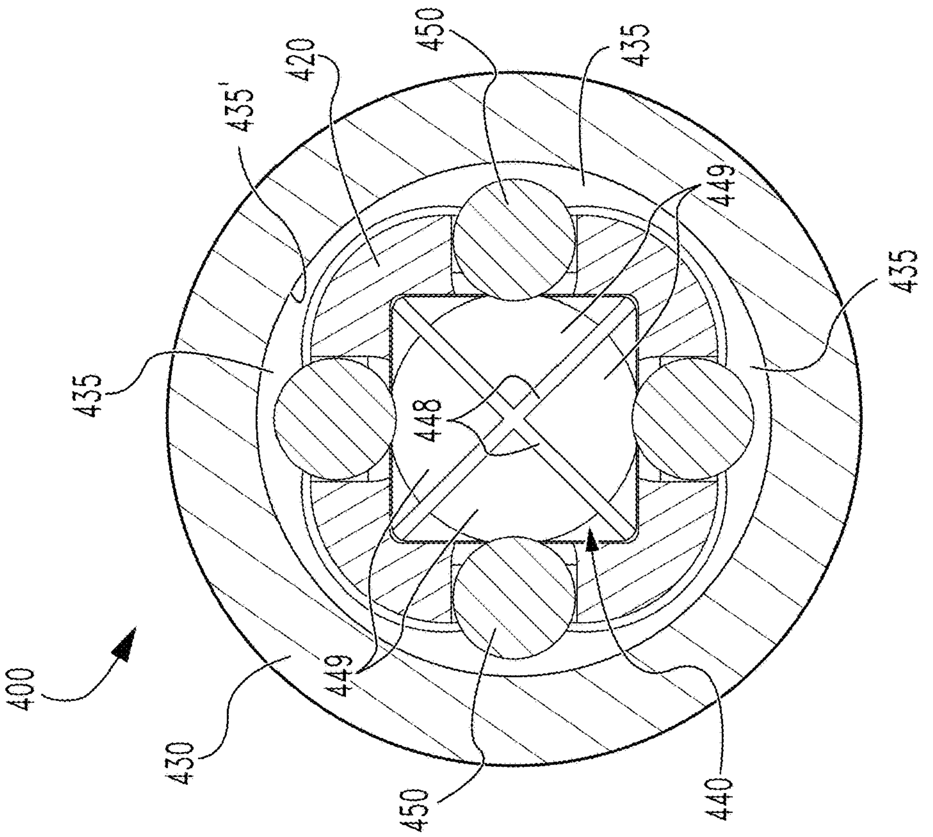
FIG. 11 is a lateral cross-sectional view of the handleset illustrated in FIG. 10.
Figure 10:
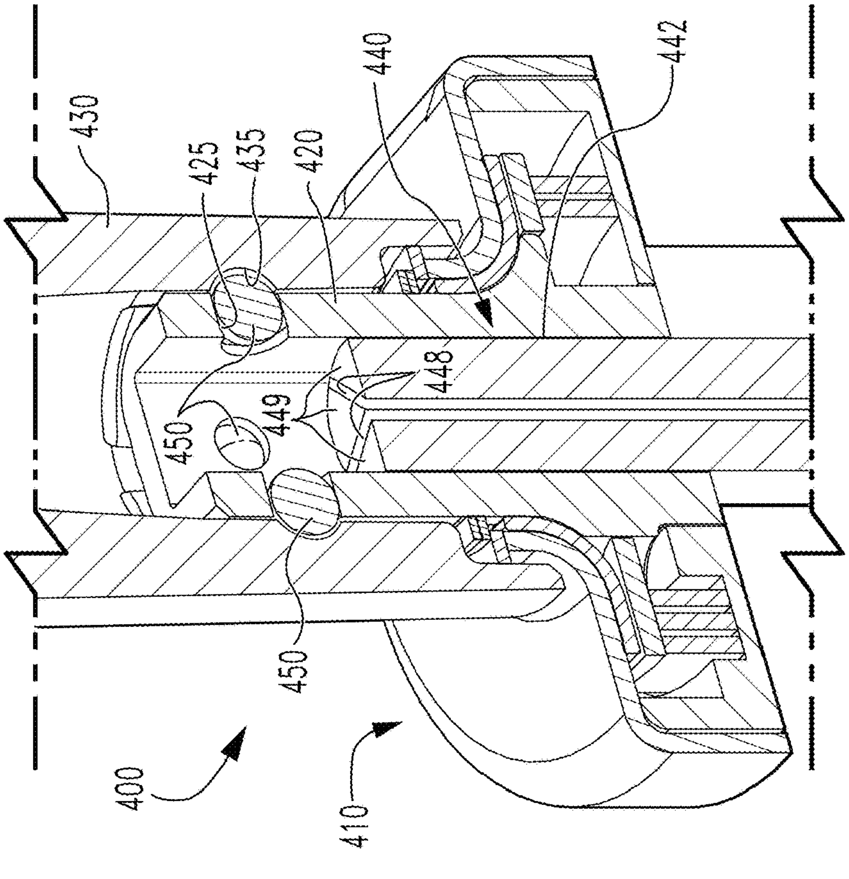
FIG. 10 is a longitudinal cutaway view of a handleset according to certain embodiments.

With additional reference to FIGS. 10 and 11, illustrated therein is a handleset 400 according to certain embodiments. The handleset 400 may, for example, be utilized as the outside handleset 120 in the lockset 100 illustrated in FIG. 1. The handleset 400 is substantially similar to the above-described handleset 300, and similar reference characters are used to indicate similar elements and features. For example, the handleset 400 includes a spring cage 410, a spindle sleeve 420, a handle 430, a spindle 440, a plurality of couplers 450, and a pair of lugs, which respectively correspond to the spring cage 310, the spindle sleeve 320, the handle 330, the spindle 340, the coupler 350, and the lugs 360. In the interest of conciseness, the following descriptions of the handleset 400 focus primarily on features that are different than those described above with regard to the handleset 300.

Like the above-described handleset 300, the illustrated handleset 400 includes a plurality of couplers 450 operable to engage an annular groove 435' that defines a plurality of interconnected recesses 435. In the illustrated form, the groove 435' has a curvilinear, generally U-shaped cross-section. It is also contemplated that the groove 435' may have a rectilinear cross-section, such as one with a rectangular geometry or one with a V-shaped geometry.

In the illustrated form, the spindle 440 includes at least one slit 448 that divides the proximal end portion 442 into at least two spindle portions 449. While the illustrated spindle 440 includes two intersecting slits 448 that divide the proximal end portion 442 into four spindle portions 449, it is also contemplated that more or fewer slits 448 may be utilized to divide the proximal end portion 442 into more or fewer spindle portions 449. The at least one slit 448 permits limited inward flexing of the at least two spindle portions 449, which may enable looser tolerances (and thus reduced manufacturing costs) for the various features of the handleset 400 that engage the couplers 450. As will be appreciated, however, the amount of flexing permitted by the at least one slit 448 is not so great as to permit the couplers 450 to move to their decoupling positions.

As noted above, the illustrated lockset 100 each of the handlesets 200, 300, 400 is capable of being used as at least the outside handleset 120 in the lockset 100. In certain forms, the inside handleset 120 may be provided in a substantially similar form as the outside handleset 120, but may lack a coupler. For example, in embodiments in which the handleset 200 is utilized as the outside handleset 120, the inside handleset 130 may be provided as a second instance of the handleset 200, wherein the second instance of the handleset 200 lacks the coupler 250. In such embodiments and others, the outside handle 123 may be interchangeable with the inside handle 133 to facilitate handing changes for the lockset 100.

Additionally, while the illustrated lockset 100 is provided in the form of a mortise lockset, it should be appreciated that the handlesets 200, 300, 400 described herein may be utilized in combination with other forms of locksets and/or access control devices, such as cylindrical, tubular, escutcheon-based, and other formats. Those skilled in the art will readily appreciate that the distal end portion of the spindle may be adapted to provide for rotation of a rotatable component in each of such alternative formats.

Certain prior approaches to selectively retaining a handle on a handleset involved selectively blocking a catch using the tailpiece of a lock cylinder. While certain such handlesets are able to maintain installation of the handle while the lock cylinder is in its locked state, the handle is able to be removed when the lock cylinder is in its unlocked state. As a result, a person with a properly authorized key would be readily able to remove the handle simply by unlocking the lock cylinder. In the current embodiments, however, the handlesets may prevent removal of the handles regardless of the locked/unlocked state of the lockset. Moreover, certain embodiments of the present application do not require a handle-mounted lock cylinder in order to provide for handle retention, which may reduce costs while still discouraging vandalism.

Certain embodiments of the present application relate to a pair of handlesets configured for use with a lockset chassis. The pair of handlesets includes a first handleset and a second handleset. The first handleset comprises a first spindle sleeve, a first spring cage, a first handle, a coupler, and a first spindle. The first spring cage is engaged with the first spindle sleeve and rotationally biases the first spindle sleeve toward a first home position. The first handle is removably mounted to the first spindle sleeve. The coupler is movably mounted to the first spindle sleeve for movement between a decoupling position in which the coupler does not prevent removal of the first handle from the first spindle sleeve and a coupling position in which the coupler prevents removal of the first handle from the first spindle sleeve. The first spindle is slidably received in the first spindle sleeve, selectively retains the coupler in the coupling position, and is operable to connect with the lockset chassis. The second handleset includes a second spindle sleeve, a second spring cage, a second handle, and a second spindle. The second spring cage is engaged with the second spindle sleeve and rotationally biases the second spindle sleeve toward a second home position. The second handle is removably mounted to the second spindle sleeve. The second spindle is slidably received in the second spindle sleeve and is operable to connect with the lockset chassis. The first handle and the second handle are interchangeable with one another. With the second handle removably mounted to the first spindle sleeve, the coupler selectively prevents removal of the second handle from the first spindle sleeve. In certain embodiments, the first handleset further comprises a first fastener operable to selectively couple the first handle and the first spindle sleeve, and the second handleset further comprises a second fastener operable to selectively couple the second handle and the second spindle sleeve. In certain embodiments, the coupler is spherical. In certain embodiments, the second handleset lacks a second of the coupler. In certain embodiments, neither the first handleset nor the second handleset comprises a lock cylinder.

Certain embodiments of the present application relate to a lockset comprising the pair of handlesets, and further comprising the lockset chassis, a latchbolt movable relative to the lockset chassis between an extended position and a retracted position. The lockset chassis further comprises a first hub and a second hub. The first hub is engaged with the first spindle and is operably connected with the latchbolt such that the latchbolt moves between the extended position and the retracted position in response to rotation of the first spindle. The second hub is engaged with the second spindle and operably connected with the latchbolt such that the latchbolt moves between the extended position and the retracted position in response to rotation of the second spindle.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A handleset, comprising:

a spindle sleeve;

a handle removably mounted to the spindle sleeve;

a coupler operable to selectively prevent removal of the handle from the spindle sleeve, the coupler having a decoupling position and a coupling position, wherein the coupler in the decoupling position is disengaged from either the spindle sleeve or the handle to permit removal of the handle from the spindle sleeve, and wherein the coupler in the coupling position is engaged with both the spindle sleeve and the handle to prevent removal of the handle from the spindle sleeve; and a spindle movably engaged with the spindle sleeve to selectively retain the coupler in the coupling position.

2. The handleset of claim 1, wherein the spindle sleeve includes a first coupling feature;

wherein the handle includes a second coupling feature;

wherein the coupler in the decoupling position is disengaged from either the first coupling feature or the second coupling to permit removal of the handle from the spindle sleeve; and wherein the coupler in the coupling position is engaged with both the first coupling feature and the second coupling to prevent removal of the handle from the spindle sleeve.

3. The handleset of claim 2, wherein the first coupling feature is aligned with the second coupling feature to facilitate transitioning of the coupler between the decoupling position and the coupling position.

4. The handleset of claim 2, wherein one of the first coupling feature and the second coupling feature comprises an aperture, and another of the first coupling feature and the second coupling feature comprises a recess.

5. The handleset of claim 1, wherein one of the spindle sleeve and the handle includes an aperture;

wherein another of the spindle sleeve and the handle includes a recess alignable with the aperture; and wherein the coupler is movably mounted in the aperture for selective engagement with the recess.

6. The handleset of claim 5, wherein the coupler in the decoupling position is disengaged from the recess to permit removal of the handle from the spindle sleeve.

7. The handleset of claim 5, wherein the coupler in the coupling position extends into the recess to prevent removal of the handle from the spindle sleeve.

8. The handleset of claim 5, wherein the recess comprises an annular channel.

9. The handleset of claim 5, wherein the recess has one of a V-shaped cross-section or a U-shaped cross-section.

10. The handleset of claim 1, wherein the spindle is configured to engage the coupler during insertion of the spindle into the spindle sleeve to drive the coupler from the decoupling position to the coupling position.

11. The handleset of claim 10, wherein the coupler is configured to roll along the spindle during insertion of the spindle into the spindle sleeve.

12. The handleset of claim 1, wherein the coupler is captured between the handle and the spindle such that the coupler is inoperable to exit the handle in a radially-outward direction.

13. The handleset of claim 1, wherein the coupler is at least partially received in the spindle sleeve when the coupler is in the decoupling position.

14. The handleset of claim 1, wherein the spindle is slidable relative to the spindle sleeve between a retaining position in which the spindle retains the coupler in the coupling position, and a releasing position in which the spindle permits movement of the coupler to the decoupling position.

15. The handleset of claim 1, further comprising a housing;

wherein the spindle sleeve is rotatably mounted to the housing and extends proximally from the housing;

wherein the coupler is positioned proximally of the housing;

wherein the spindle includes a proximal end portion and an opposite distal end portion; and wherein the spindle has a retaining position in which the proximal end portion is engaged with the coupler and the distal end portion is positioned distally of the housing.

16. A lockset comprising the handleset of claim 1, the lockset further comprising a chassis, the chassis comprising:

a latchbolt mounted for movement between an extended position and a retracted position; and a hub operably connected with the latchbolt such that rotation of the hub drives the latchbolt between the extended position and the retracted position; and wherein the spindle is rotationally coupled with the hub.

17. The handleset of claim 1, wherein the coupler is inoperable to be removed from the handle in a radially-outward direction.

18. The handleset of claim 1, wherein the spindle engages the coupler to maintain the coupler in a radially-outward position corresponding to the coupling position.

19. The handleset of claim 1, wherein insertion of the spindle into the spindle sleeve drives the coupler in a radially-outward direction to the coupling position.

20. A handleset, comprising:

a spindle sleeve;

a handle removably mounted to the spindle sleeve;

a threaded fastener extending between the spindle sleeve and the handle to secure the handle to the spindle sleeve;

a coupler operable to selectively prevent removal of the handle from the spindle sleeve, the coupler having a decoupling position and a coupling position, wherein the coupler in the decoupling position is disengaged from either the spindle sleeve or the handle to permit removal of the handle from the spindle sleeve, and wherein the coupler in the coupling position is engaged with both the spindle sleeve and the handle to prevent removal of the handle from the spindle sleeve; and a spindle movably engaged with the spindle sleeve to selectively retain the coupler in the coupling position.

21. A handleset, comprising:

a spindle sleeve;

a handle removably mounted to the spindle sleeve;

at least one additional coupler having an additional decoupling position and an additional coupling position, wherein the spindle selectively retains the each of the at least one additional coupler in the additional coupling position;

a coupler operable to selectively prevent removal of the handle from the spindle sleeve, the coupler having a decoupling position and a coupling position, wherein the coupler in the decoupling position is disengaged from either the spindle sleeve or the handle to permit removal of the handle from the spindle sleeve, and wherein the coupler in the coupling position is engaged with both the spindle sleeve and the handle to prevent removal of the handle from the spindle sleeve; and a spindle movably engaged with the spindle sleeve to selectively retain the coupler in the coupling position.

22. A handleset, comprising:

a spindle sleeve;

a handle removably mounted to the spindle sleeve;

a coupler comprising a roller and operable to selectively prevent removal of the handle from the spindle sleeve, the coupler having a decoupling position and a coupling position, wherein the coupler in the decoupling position is disengaged from either the spindle sleeve or the handle to permit removal of the handle from the spindle sleeve, and wherein the coupler in the coupling position is engaged with both the spindle sleeve and the handle to prevent removal of the handle from the spindle sleeve; and a spindle movably engaged with the spindle sleeve to selectively retain the coupler in the coupling position.

23. The handleset of claim 22, wherein the roller comprises a ball.

* * * * *